April 21, 1942.  M. ZAIGER  2,280,566
WINDSHIELD WIPER CLIP
Filed Oct. 6, 1941
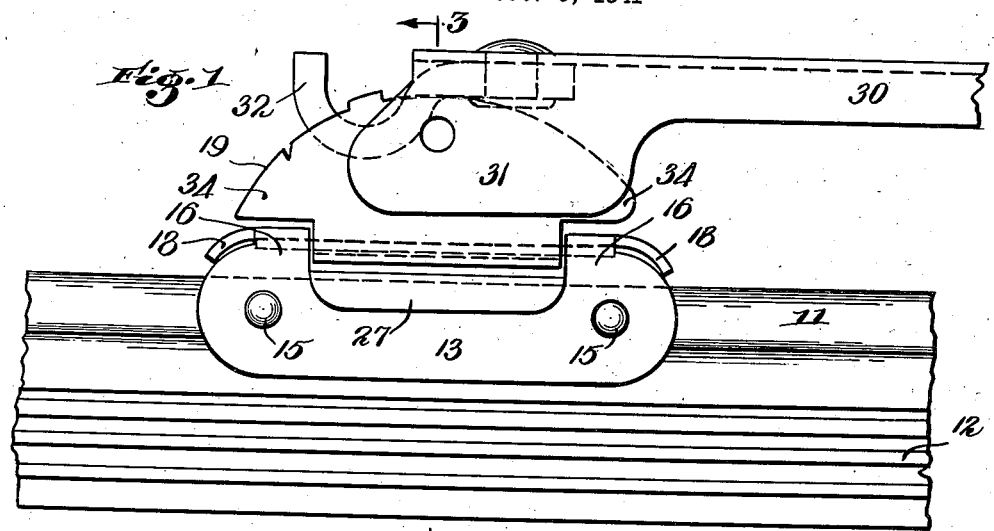
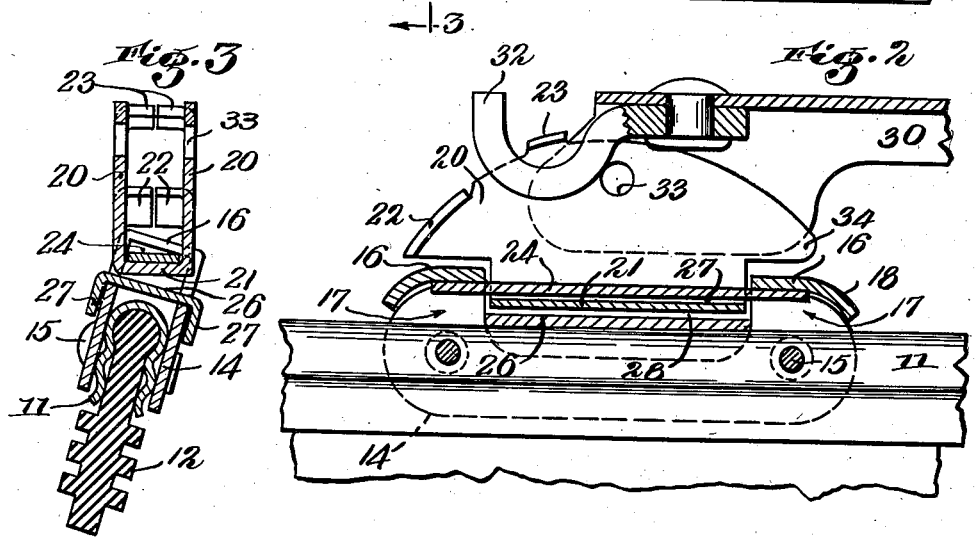
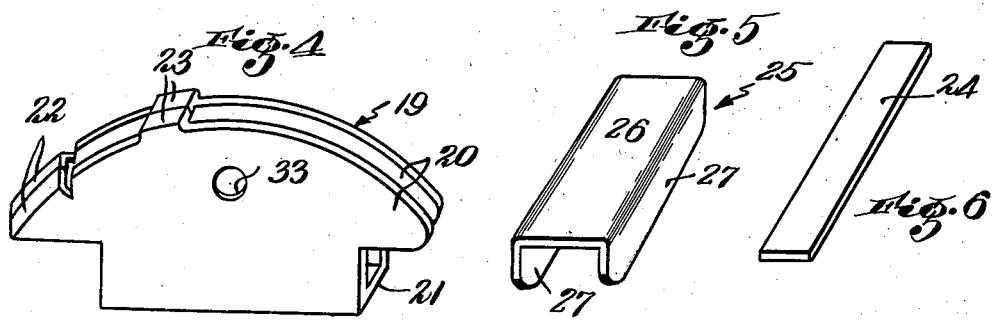
Inventor
Max Zaiger
By Thomson & Thomson
his Attys.

Patented Apr. 21, 1942

2,280,566

UNITED STATES PATENT OFFICE 2,280,566

WINDSHIELD WIPER CLIP

Max Zaiger, Swampscott, Mass.

Application October 6, 1941, Serial No. 413,719

2 Claims. (Cl. 15—250)

This invention relates to improvements in clips or connectors for attaching a windshield wiper blade to a wiper arm, and pertains more particularly to a rocking connector of the character disclosed in my Patent No. 2,234,791, dated March 11, 1941.

My said patent shows a rocking connector comprising a saddle member or sub-clip attached to the wiper blade, a clip hinged to the saddle member and adapted to be connected to the end of the wiper arm, and a spring constantly reacting upon the saddle and clip to hold those parts in normal position with the clip disposed in the plane of the blade.

Although the patented connector is generally satisfactory for use with a wiper arm which exerts sufficient pressure to overcome the resistance of the connector spring and ensure the desired rocking or flopping of the blade while it is reciprocated over the windshield, I have found that the spring is unnecessary for efficient operation of the rocking connector and that a connector without a spring performs more efficiently and avoids the necessity of providing an undesirable heavy-pressure arm which is required to rock a blade having a spring-actuated connector.

It is, therefore, the principal purpose of the present invention to provide a simple and efficient rocking connector of this type which may be easily manufactured and readily assembled before its application to the wiper blade, without the utilization of a spring or other resilient member and without the necessity for the precise accuracy in the construction and fit of the parts which is necessary in the arrangement described in my said patent.

A connector made in accordance with the present invention may be manufactured economically from sheet metal by simple cutting and forming operations, and the new construction provides a substantially flat surface on which the base of the rocking clip may work freely and smoothly during actuation of the wiper blade without the resistance imposed by a non-essential spring.

As a further feature of the improved construction, I have provided a non-resilient strip or bar which is preferably inserted between the rocking clip and the saddle or sub-clip of the connector, to provide the pivotal connection between these parts, and a non-resilient intervening saddle or base plate to afford a smooth bearing surface and to prevent excessive clicking thereof when the connector is not in use.

A recommended embodiment of the invention is illustrated in the accompanying drawing, in which:

Fig. 1 is a fragmentary side elevation of a wiper blade and wiper arm separably connected by the improved clip;

Fig. 2 is a central longitudinal section of the connector shown in Fig. 1, with the wiper blade and arm hook in elevation;

Fig. 3 is an enlarged transverse section on line 3—3 of Fig. 1, with the wiper arm omitted;

Fig. 4 is a perspective view of the rocking clip of the connector;

Fig. 5 is a perspective view of the base plate or saddle which presents a working surface for the base of the rocking clip; and Fig. 6 is a perspective view of the hinge bar which pivotally connects the rocking clip to the sub-clip fastened to the blade.

The improved connector may be applied to any usual type of wiper blade and may be attached to wiper arms having hooked ends, U-shaped attaching portions, or both. As here shown, the wiper blade comprises a U-shaped holder 11 or shell of sheet metal and a rubber wiper strip 12 secured between the sides of the holder, and the connector comprises a sub-clip 13 having sides 14 fixed to the blade by rivets 15 passing through the holder and rubber strip. The top of the sub-clip is cut away at its center to provide bridge members 16 at its opposite ends, formed by bending the sides 14 downwardly, and the bridge members are permanently spaced from the top of the wiper blade by the rigid attachment of the sub-clip, thereby providing underlying pockets 17 which are partially closed by curved end tabs 18 bent downwardly from the respective bridge members.

A clip member 19 stamped from sheet metal and formed to provide spaced parallel sides 20 upstanding from a flat base 21, and inwardly bent, abutting tongues 22 and 23 at its upper margin, is pivotally connected to the sub-clip 13 by placing its base 21 in the central opening between the bridge members at the top of the sub-clip and inserting a hinge bar 24 above the base 21 of the clip and below the bridge members or hinge ears 16 of the sub-clip (Fig. 2).

The hinge bar preferably consists of a flat strip of non-resilient sheet metal, and is held against accidental longitudinal displacement by the end tongues 18 of the sub-clip.

As the depth of the pockets 17 is substantially greater than the combined thickness of the clip base 21 and the hinge bar 24 and as the rounded top of the blade holder 11 affords an unsatisfactory bearing surface for the base 21 of the rockable clip, I prefer to employ a removable saddle-like bearing plate 25 (Fig. 5) having a flat top 26 and depending side flanges 27 which straddle the sides 20 of the sub-clip when the saddle 25 is inserted beneath the clip base 21 at the bottom of the central opening of the sub-clip. The saddle not only affords a flat and smooth working surface on which the clip base 21 may freely turn without binding, as the clip and sub-clip are rocked or tilted relative to each other (Fig. 3), but also reduces the clicking noise which might be objectionable to a prospective purchaser handling a wiper blade equipped with the loosely hinged connector above described.

Even with the saddle 25 in place, the pivotal connection between clip and sub-clip is quite loose, as indicated by the free space between the clip base 21 and the hinge bar 24 and saddle 25, respectively, in Fig. 2 of the drawing. It will be understood, of course, that these parts are normally in engagement under the action of gravity, and that the spacing shown at 27 and 28 in said figure is abnormal and illustrated diagrammatically to demonstrate the looseness and freedom at the connector hinge. As it is desired that the rocking movement above described be unrestrained within the limits of swing permitted, as indicated in Fig. 3, the use of springs or other resilient elements which would tend to resist free tilting of the hinged parts, is avoided. Hence, the saddle or base plate 26 is preferably made of ordinary sheet metal or of other non-resilient sheet material, for example, a plastic or fibre product, which will afford a substantially flat top surface 26 and which will tend to deaden the clicking of the parts when the wiper blade is shaken in the hand. It is apparent, however, that the base plate may be made in other forms and may, if desired, be an integral part of the sub-clip, as a flange bent inwardly from one of its sides 14.

It will be understood that any clicking noise would be unnoticeable when the wiper blade is in operation, and that the chief functional purpose of the saddle or base plate 26 is to provide the substantially flat and smooth surface on which the clip base 21 rests and turns during operation. It will also be understood that the rocking of the connector parts permits the wiper blade to tilt or flop from side to side during reciprocation, so that the sides of the flexible wiping strip 12 are alternately engaged with the glass surface of the windshield, the extent to which the rubber is thus bent depending upon the inward pressure of the wiper arm.

The clip 19 is designed for separable attachment to various types of wiper arms. As shown in the drawing, the arm 30 is provided with a U-shaped end 31 which straddles the sides 20 of the clip, and also with a hook 32 which is received between said sides and projects upwardly therefrom between the ears 22 and 23 which limit longitudinal movement of the hook with respect to the clip. For arm terminals having U-shaped ends adapted to be bolted to the blade connector, the clip sides may have holes 33 for receiving the retaining bolt (not shown).

The clip sides 20 may have projecting wing portions 34 which overhang the hinge ears or bridges 16, as shown herein and as also disclosed in my aforesaid Patent No. 2,234,791, but these wings while desirable are not essential to maintain the connector parts in assembled relation, for the insertion of the hinge bar 24 will hold the clip and sub-clip against separation before the latter is fastened to the wiper blade. It will be noted that the length of the clip base 21 is shorter than the distance between the bridge members 16, so that the clip may be freely assembled with or removed from the sub-clip, when the hinge bar 24 is not in place. The clip 19, sub-clip 13, and saddle member 26 are assembled and the connecting hinge bar 24 is inserted before the end tongues 18 of the sub-clip are bent downwardly to retain the hinge bar in the position shown in Figs. 1 and 2; said end tongues being depressed by hand or by a suitable tool after all the other parts are in place, and serving to hold them in assembled relation. The assembled connector may thus be packed and sold as a separate unit, or as a fixed attachment of a commercial wiper blade; and the connector may be applied directly to the blade holder as herein illustrated, or to a yoke member or other blade attachment as disclosed in my said patent.

I claim:

1. A connector for attaching a wiper arm to a wiper blade, comprising a sub-clip fixedly connectable to the blade and having transversely spaced sides and longitudinally spaced bridge members integral with the sides adjacent the ends thereof, said bridge members constituting hinge ears and defining underlying pockets, a rocking clip connectable to the wiper arm and having spaced sides and an integral base received between said hinge ears, a hinge bar disposed between the sides of the rocking clip and having ends projecting into the pockets beneath the hinge ears for pivotally connecting the clip members so that they may freely tilt relative to each other, and a non-resilient bearing plate located between said hinge ears and beneath said clip base to provide a substantially smooth surface on which said base turns during relative rocking movement of the connector parts.

2. A connector for attaching a wiper arm to a wiper blade, comprising a sub-clip fixedly connectable to the blade and having transversely spaced sides and longitudinally spaced bridge members integral with the sides adjacent the ends thereof, said bridge members constituting hinge ears and defining underlying pockets, a rocking clip connectable to the wiper arm and having spaced sides and an integral base received between said hinge ears, a non-resilient hinge bar disposed between the sides of the rocking clip and having ends projecting into the pockets beneath the hinge ears for pivotally connecting the clip members so that they may freely tilt relative to each other, and a non-resilient, removable saddle member located between said hinge ears and beneath said clip base and having depending sides straddling the sides of the sub-clip, said saddle having a substantially flat top providing a smooth bearing surface on which the clip base turns during relative rocking movement of the connector parts.

MAX ZAIGER.